US011137913B2

(12) United States Patent
Vanninen et al.

(10) Patent No.: US 11,137,913 B2
(45) Date of Patent: Oct. 5, 2021

(54) GENERATION OF A PACKAGED VERSION OF AN IO REQUEST

(71) Applicant: Hewlett Packard Enterprise Development LP, Houston, TX (US)

(72) Inventors: Matti Vanninen, Cary, NC (US); Christopher J. Corsi, Wake Forest, NC (US); Xiaokang Sang, Cary, NC (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/593,005

(22) Filed: Oct. 4, 2019

(65) Prior Publication Data

US 2021/0103387 A1   Apr. 8, 2021

(51) Int. Cl.
G06F 3/06 (2006.01)
G06F 13/40 (2006.01)
G06F 13/42 (2006.01)
G06F 9/54 (2006.01)

(52) U.S. Cl.
CPC .......... *G06F 3/061* (2013.01); *G06F 3/0658* (2013.01); *G06F 3/0662* (2013.01); *G06F 9/545* (2013.01); *G06F 13/4027* (2013.01); *G06F 13/4221* (2013.01); *G06F 3/067* (2013.01); *G06F 3/0679* (2013.01)

(58) Field of Classification Search
None
See application file for complete search history.

(56) References Cited

U.S. PATENT DOCUMENTS

| 6,594,709 | B1 | 7/2003 | Agasaveeran et al. |
| 7,467,191 | B1 | 12/2008 | Wang et al. |
| 8,090,837 | B2 | 1/2012 | Shin et al. |
| 8,484,357 | B2 | 7/2013 | Shin et al. |
| 8,555,279 | B2 * | 10/2013 | Nonaka ............... G06F 9/45558 718/1 |
| 8,626,967 | B1 | 1/2014 | Naik et al. |
| 8,650,302 | B2 | 2/2014 | Shin et al. |
| 8,650,328 | B1 | 2/2014 | Chatterjee et al. |
| 9,760,297 | B2 | 9/2017 | Karr et al. |
| 10,185,639 | B1 | 1/2019 | Chatterjee et al. |

(Continued)

FOREIGN PATENT DOCUMENTS

WO    2016/043953 A2    3/2016

OTHER PUBLICATIONS

Mostafa Khalil, "ALUA", vSphere 6: A Technology Deep Dive, 2nd Edition, Oct. 5, 2017, 15 pages.

(Continued)

*Primary Examiner* — Brian R Peugh
(74) *Attorney, Agent, or Firm* — Hewlett Packard Enterprise Patent Department

(57) ABSTRACT

Examples may forward an input/output (IO) request with use of kernel-level instructions. Examples may receive the IO request via a port of a standby controller, generate an alternate version of the IO request using at least kernel-level instructions of the standby controller, and provide the alternate version of the IO request to physical memory of the active controller by providing the alternate version of the IO request to a designated region of physical memory of the standby controller that is mapped to a designated region of the physical memory of the active controller.

20 Claims, 6 Drawing Sheets

(56) References Cited

U.S. PATENT DOCUMENTS

| | | | |
|---|---|---|---|
| 2003/0004952 A1 | 1/2003 | Nixon et al. | |
| 2003/0126225 A1 | 7/2003 | Camble et al. | |
| 2003/0131182 A1 | 7/2003 | Kumar et al. | |
| 2004/0003126 A1* | 1/2004 | Boucher | G06F 13/4022 709/250 |
| 2005/0033916 A1 | 2/2005 | Dellacona | |
| 2005/0055606 A1 | 3/2005 | Kutan et al. | |
| 2005/0060443 A1* | 3/2005 | Rosner | G06F 13/128 710/33 |
| 2005/0259632 A1 | 11/2005 | Malpani et al. | |
| 2008/0133942 A1 | 6/2008 | Ogasawara et al. | |
| 2011/0116362 A1 | 5/2011 | Singatwaria | |
| 2012/0272241 A1* | 10/2012 | Nonaka | G06F 9/45558 718/1 |
| 2013/0066837 A1 | 3/2013 | Colrain et al. | |
| 2013/0254435 A1* | 9/2013 | Shapiro | G06F 3/065 710/23 |
| 2014/0032796 A1 | 1/2014 | Krause | |
| 2014/0244936 A1 | 8/2014 | Maharana et al. | |
| 2015/0262632 A1 | 9/2015 | Shelton et al. | |
| 2015/0301964 A1 | 10/2015 | Brinicombe et al. | |
| 2016/0077738 A1 | 3/2016 | Chiu et al. | |
| 2016/0077752 A1 | 3/2016 | Vanninen | |
| 2016/0077996 A1 | 3/2016 | Bali et al. | |
| 2018/0067771 A1 | 3/2018 | Frandzel et al. | |
| 2018/0189199 A1* | 7/2018 | Condict | G06F 3/0679 |

OTHER PUBLICATIONS

Paul Green, "Best Practices for Configuring ftscalable Storage Arrays on OpenVOS Systems," available online at <https://www.stratus.com/openvos-blog/best-practices-for-configuring-ftscalable-storage-arrays-on-openvos-systems>, Mar. 19, 2019, 20 pages.

Veritas, "Active/Active and Active/Passive settings: Dynamic Multi-Pathing", available online at <https://sort.veritas.com/public/documents/vis/7.1/windows/productguides/html/sf_admin/ch13s03.htm>, Mar. 19, 2019, 3 pages.

"Fiemap Ioctl", available online at <https://www.kernel.org/doc/Documentation/filesystems/fiemap.txt>, Retrived on Aug. 28, 2019, 4 pages.

Claude Bilodeau, "On IP networking over tactical links", CRC RP-2003-008, Aug. 2003, 82 pages.

George Penokie, "SAM-4: Converting to UML part 1", T10/06-116 revision 2, 52 pages.

International Preliminary Report on Patentability for PCT Application No. PCT/US2015/047535, dated Mar. 30, 2017, 11 pages.

Linux Kernel Organization, Inc.,"NTB Drivers", available online at <https://www.kernel.org/doc/Documentation/ntb.txt>, Retrieved on Sep. 11, 2019, 4 pages.

Non-Final Office Action for U.S. Appl. No. 14/846,689, dated May 23, 2017, 31 pages.

Paul Green, "Best Practices for Configuring ftScalable Storage Arrays on OpenVOS Systems", available online at <https://www.stratus.com/openvos-blog/best-practices-for-configuring-ftscalable-storage-arrays-on-openvos-systems>, Retrieved in 2019, 18 pages.

Search Report and Written Opinion received for PCT Application No. PCT/US2015/047535, dated Nov. 27, 2015, 12 pages.

Vaughn Stewart, "Pure Storage 101: Ensuring 100% Performance", available online at <https://blog.purestorage.com/pure-storage-101-ensuring-100-performance/>, Apr. 2, 2014, 9 pages.

VERITAS, "Active/Active and Active/Passive settings: Dynamic Multi-Pathing", available online at <https://sort.veritas.com/public/documents/vis/7.1/windows/productguides/html/sf_admin/ch13s03.htm>, Retrieved on Oct. 7, 2019, 2 pages.

VERITAS, "DMP Overview: Dynamic Multi-Pathing", Retrieved on Sep. 5, 2019, 1 page.

VERTIAS Technologies LLC, "Major features of Dynamic Multi-Pathing," available online at <https://sort.veritas.com/public/documents/vis/7.1/windows/productguides/html/sf_admin/ch13s02.htm>, Retrieved on Sep. 5, 2019, 1 page.

VERTIAS Technologies LLC, "Specify load balancing settings and the primary path," Retrieved on Sep. 5, 2019, 1 page.

Wikipedia, "Ioctl", available online at <https://en.wikipedia.org/w/index.php?title=Ioctl&oldid=888924343>, Mar. 22, 2019, 7 pages.

Wikipedia, "Memory-Mapped File", available online at <https://en.wikipedia.org/w/index.php?title=Memory-mapped_file&oldid=912850723>, Aug. 28, 2019, 5 pages.

Wikipedia, "Remote Procedure Call,", available online at <https://en.wikipedia.org/w/index.php?title=Remote_procedure_call&oldid=915142152>, Sep. 11, 2019, 5 pages.

NETAPP, Inc., "Data ONTAP® DSM 4.1 for Windows® MPIO: Installation and Administration Guide", available online at <https://library.netapp.com/ecm/ecm_download_file/ECMP1307349>, Jan. 2018, 123 pages.

NETAPP, Inc., "DSM Prefers Optimized Paths,", Part No. 215-08059_A0, available online at <https://library.netapp.com/ecmdocs/ECMP1204463/html/GUID-C9386A95-9244-4F9B-B89A-793172916E97.html>, May 29, 2013, 1 page.

* cited by examiner

GENERATION OF A PACKAGED VERSION OF AN IO REQUEST

BACKGROUND

A computing system, such as a storage array, server, or the like, may include a plurality of controllers (e.g., storage controllers, array controllers, or the like) for redundancy and high availability of the system, for example. In such examples, at a given time, a first controller of the system may operate as an active controller to perform input/output (IO) operations on storage volume(s) of the of the system, and a second controller may operate as a standby controller that is available to take over operation as the active controller should the first controller fail, encounter other difficulties, etc.

BRIEF DESCRIPTION OF THE DRAWINGS

The following detailed description references the drawings, wherein.

DETAILED DESCRIPTION

Figure 1:
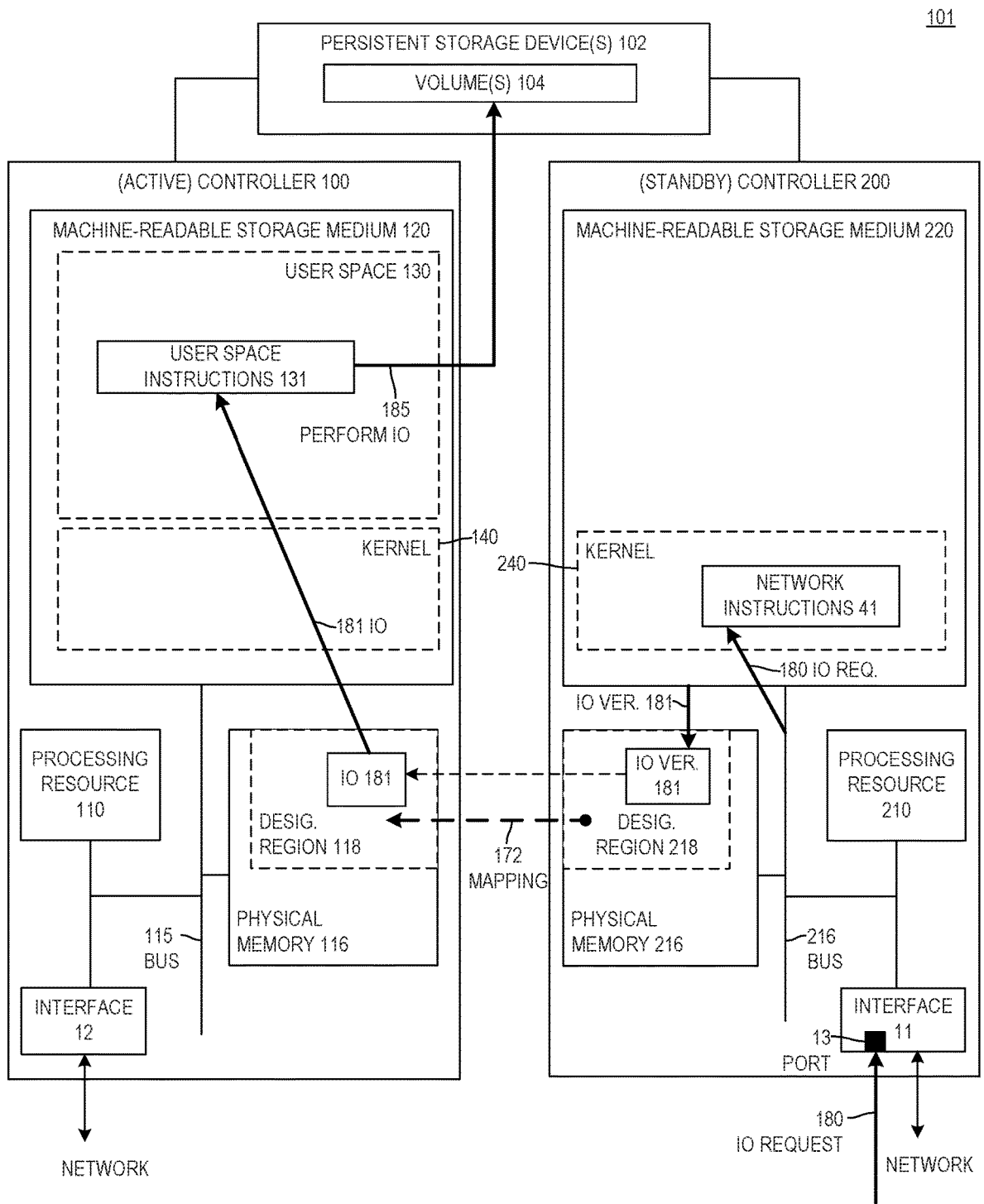
FIG. 1 is a block diagram of an example computing system to provide a version of an input/output (IO) request to physical memory of an active controller.

In some examples, a computing system (such as a storage array, server, or the like) having multiple controllers may be able to receive input/output (IO) commands from a host or client (e.g., a separate server, or other computing device) via the ports of the active controller, but may not be able to receive IO commands via the ports of the standby controller. For example, a storage array may comprise first and second controllers, each having a network interface device with one or more ports (e.g., Fibre Channel (FC) ports) for communicating with hosts (e.g., via a computer network). In some examples, the storage array may be able to receive IO requests via the ports (referred to as "active" ports) of the network interface device of the controller operating as the active controller, but not via the ports (referred to as "standby" ports) of the network interface device of the controller operating as the standby controller. In some examples, this may be implemented using asymmetric logical unit access (ALUA) states for the ports. For example, the active ports of the active controller may be assigned an ALUA "active optimized" (AO) state in which the ports are able to receive IO requests for processing, and the standby ports of the standby controller may be assigned an ALUA "standby" (S) state in which the ports are not able to receive IO requests for processing. This may be referred to here as an active optimized/standby ("AO/S") configuration.

Such an active optimized/standby (AO/S) configuration may be disadvantageous for several reasons. For example, providing a sufficient number of active ports of a storage array for hosts to communicate with may involve providing the sufficient number of ports on each controller, so that any controller may provide that sufficient number of active ports when it operates as the active controller. As another example, such configurations may limit the performance of the array, since the resources of the standby controller are not available for any processing IO requests.

Some examples may address issues noted above by providing a computing system (e.g., a storage array) with an active optimized/active optimized ("AO/AO") configuration. In such examples, with active ports available on each controller, a sufficient number of ports may be provided by the system with fewer ports on each controller. This configuration may also be better for host interoperability, as the AO/AO configuration may be more widely used by hosts than the AO/S configuration. The AO/AO configuration may also provide more resilience, as this configuration may allow a host to perform IO even if the host only has available path(s) to one of the controllers (e.g., due to misconfiguration or failure of all paths to another controller).

However, a configuration providing active port(s) on both the active and standby controllers may also be problematic depending on the implementation. For example, such a configuration may be problematic if a communication mechanism between the active and standby controllers is too slow (i.e., has relatively high latency). For example, using a virtual Ethernet device to communicate between controllers may impose too severe a limit on performance to beneficially communicate IO requests between active and standby controllers (e.g., due to the software overhead of using transmission control protocol/internet protocol (TCP/IP)).

To address these issues, examples described herein may provide relatively low latency transfer of IO requests from a standby controller to an active controller by mapping physical memory of the standby controller to physical memory of the active controller (e.g., via hardware bridge devices of the active and standby controller). In such examples, the standby controller may provide IO requests to physical memory of the active controller by writing the IO requests to a mapped region of the physical memory of the standby controller. In such examples, by virtue of the mapping, the IO requests stored in the physical memory of the standby controller may be transferred to the physical memory of the active controller by a mechanism that implements the mapping, such as hardware bridge devices. In this manner, the IO requests may be provided between the respective physical memories of the standby and active controllers without the software overhead of communication protocol(s), format changes, or the like, and with the relatively low latency of hardware bridge devices, such as a Peripheral Component Interface (PCI) bridge devices. In some examples, the hardware bridge devices may be respective non-transparent bridge (NTB) devices of the standby and active controllers. Examples are described below in relation to the figures.

FIG. 1 is a block diagram of an example computing system 101 to provide a version of an IO request to physical memory of an active controller. In examples described herein, a "system" may be implemented by any suitable combination of hardware and software (e.g., machine-readable, instructions executable by a processing resource). For example, in examples described herein, a system (such as computing system 101) may be implemented a computing device (e.g., a server, storage array, hyperconverged system, or the like), or a plurality of computing devices. For example, computing system 101 of FIG. 1 may be a server or storage array comprising a controller 100, a controller 200, and one or more persistent storage devices 102 that may be physically accessible by controllers 100 and 200 (though in some examples, a controller configured as an active controller may be enabled to perform IO on the persistent storage devices 102 while a controller configured as a standby controller may not be enabled to perform IO on the persistent storage devices 102).

In the example of FIG. 1, controller 100 may comprise at least one processing resource 110, at least one machine-readable storage medium 120, physical memory 116, and a network interface device 12. Hardware components of standby controller may communicate with one another over one or more busses 115. Controller 200 may comprise at least one processing resource 210, at least one machine-readable storage medium 220, physical memory 216, and a network interface device 11. Hardware components of standby controller may communicate with one another over one or more busses 216. In examples described herein, physical memory may be implemented by random-access memory (RAM), dynamic random access memory (DRAM), or the like. Each of physical memory 116 and physical memory 216 may be implemented by one or more physical memory devices (e.g., DRAM devices, dual-inline memory modules (DIMMs), or the like). In some examples herein, physical memory may be implemented by any suitable type of volatile or non-volatile memory that uses load/store semantics.

In examples described herein, a network interface device may be any suitable hardware device for communicating on a computer network, such as a storage area network (SAN). In the example of FIG. 1, network interface devices 12 and 11 may be respective network interface cards (NICs), FC host-bus adapters (HBAs), or the like, to communicate over one or more computer networks. For example, network interface devices 12 and 11 may be respective FC HBAs (as shown by FC HBAs 112, 212 in the example of FIG. 3), each having one or more FC ports to send data on and receive data from a SAN 106 (over which the controllers may communicate with host(s)). In examples described herein, a computer network may include, for example, a SAN, a local area network (LAN), a virtual LAN (VLAN), a wireless local area network (WLAN), a virtual private network (VPN), the Internet, an internal application-specific integrated circuit (ASIC) and/or a software transport, or the like, or a combination thereof.

Referring again to the example of FIG. 1, the at least one storage medium 120 may comprise (e.g., may be encoded with) a plurality of instructions that are executable by the at least one processing resource 110 of controller 100 to implement functionalities described herein in relation to active controller 100 (i.e., when controller 100 is to operate as the active controller). For example, the instructions of the at least one storage medium 120 may include user space instructions 130 and kernel-level instructions 140.

The user space instructions 130 may include instructions 131 to be executed by processing resource 110 in user space of controller 100 (e.g., as opposed to kernel space). In examples described herein, user space may refer to, for example, an unprivileged mode of operation of a processing resource in which the processing resource is able to access at least a portion of physical memory to which virtual memory assigned to the user space is mapped. Any functionalities described herein as performed by user space instructions 131 may be performed by processing resource 110 executing user space instructions 131 (e.g., in user space of controller 100).

The kernel-level instructions 140 may be executed by processing resource 110 in kernel space of controller 100 (e.g., as opposed to user space). In some examples, kernel-level instructions 140 may be instructions to implement a kernel-level network stack to, among other things, interface between a network interface device and an Internet Small Computer System Interface (iSCSI) transport in user space of the same controller. In other examples, the kernel-level instructions 140 may comprise FC driver instructions (such as kernel-level FC driver instructions 142 illustrated in the example of FIG. 3) to be executed by processing resource 110 in kernel space of controller 100 (e.g., as opposed to user space). In examples described herein, kernel space may refer to, for example, a privileged mode of operation of a processing resource in which the processing resource is able to access all of the physical memory associated with that processing resource (e.g., without going through a virtual memory mapping). Any functionalities described herein as performed by kernel-level instructions 140 (e.g., instructions 42, 142, etc.) may be performed by processing resource 110 executing those instructions (e.g., in kernel space of controller 100). Although in the example of FIG. 1, instructions 131 and 42 are illustrated as stored on at least one storage medium 120 of controller 100, in other examples, such instructions may be stored elsewhere (e.g., in whole or in part).

In the example of FIG. 1, the at least one storage medium 220 may comprise (e.g., may be encoded with) a plurality of instructions that are executable by the at least one processing resource 210 of controller 200 to implement functionalities described herein in relation to standby controller 200 (i.e., when controller 200 is to operate as the standby controller).

For example, the instructions of the at least one storage medium 220 may include at least kernel-level instructions 240. The kernel-level instructions 240 may include kernel-level network instructions 41 to be executed by processing resource 210 in kernel space of controller 200 (e.g., as opposed to user space). In some examples, kernel-level network instructions 41 may be instructions to implement a kernel-level network stack to, among other things, interface between a network interface device and an iSCSI transport in user space of the same controller. In other examples, the kernel-level network instructions 41 may be FC driver instructions (such as kernel-level FC driver instructions 242 illustrated in the example of FIG. 3) to be executed by processing resource 210 in kernel space of controller 200 (e.g., as opposed to user space). Any functionalities described herein as performed by kernel-level instructions 240 (e.g., instructions 41, 242, etc.) may be performed by processing resource 210 executing those instructions (e.g., in kernel space of controller 200). Although in the example of FIG. 1, instructions 240 are illustrated as stored on at least one storage medium 220 of controller 200, in other examples, such instructions may be stored elsewhere (e.g., in whole or in part). In some examples, controller 200 may comprise and/or execute instructions equivalent to instructions 130 and 140 to perform the functionalities of the active controller as described herein in relation to active controller 100 (e.g., when controller 200 is to be the active controller, such as after a failover from the active controller, etc.). In some examples, controller 100 may also comprise and/or execute instructions equivalent to those executed by controller 200 (including instructions 240) to perform the functionalities of the standby controller as described herein in relation to standby controller 200 (e.g., when controller 100 is to be the standby controller, such as after a failover from controller 100 to controller 200 as the active controller, etc.)

In the example of FIG. 1, each of the persistent storage device(s) 102 may be a non-volatile storage device, such as a hard disk drive (HDD), a solid state drive (SSD) (such as a flash drive), or any other suitable device to store data in a non-volatile manner. In some examples, the persistent storage device(s) 102 may comprise any combination of one or more of any such non-volatile storage devices. In some examples, computing system 101 (e.g., storage array 101 in some examples) may store data on persistent storage device(s) 102 in the form of one or more volumes 104 (such as "virtual volumes" or "LUNs" or the like), each of which may comprise a virtual address space backed by one or more of the persistent storage device(s) 102 such that, when data is stored to the volume, the data may be stored to one or more of the persistent storage device(s) 102 (e.g., when flushed from cache, etc.). As noted above, each of controllers 100 and 200 may have a physical connection to persistent storage device(s) 102 (e.g., through cables, or other communication channel(s)), even though a controller may not be enabled to communicate with the persistent storage device(s) 102 when operating as a standby controller.

Figure 2:
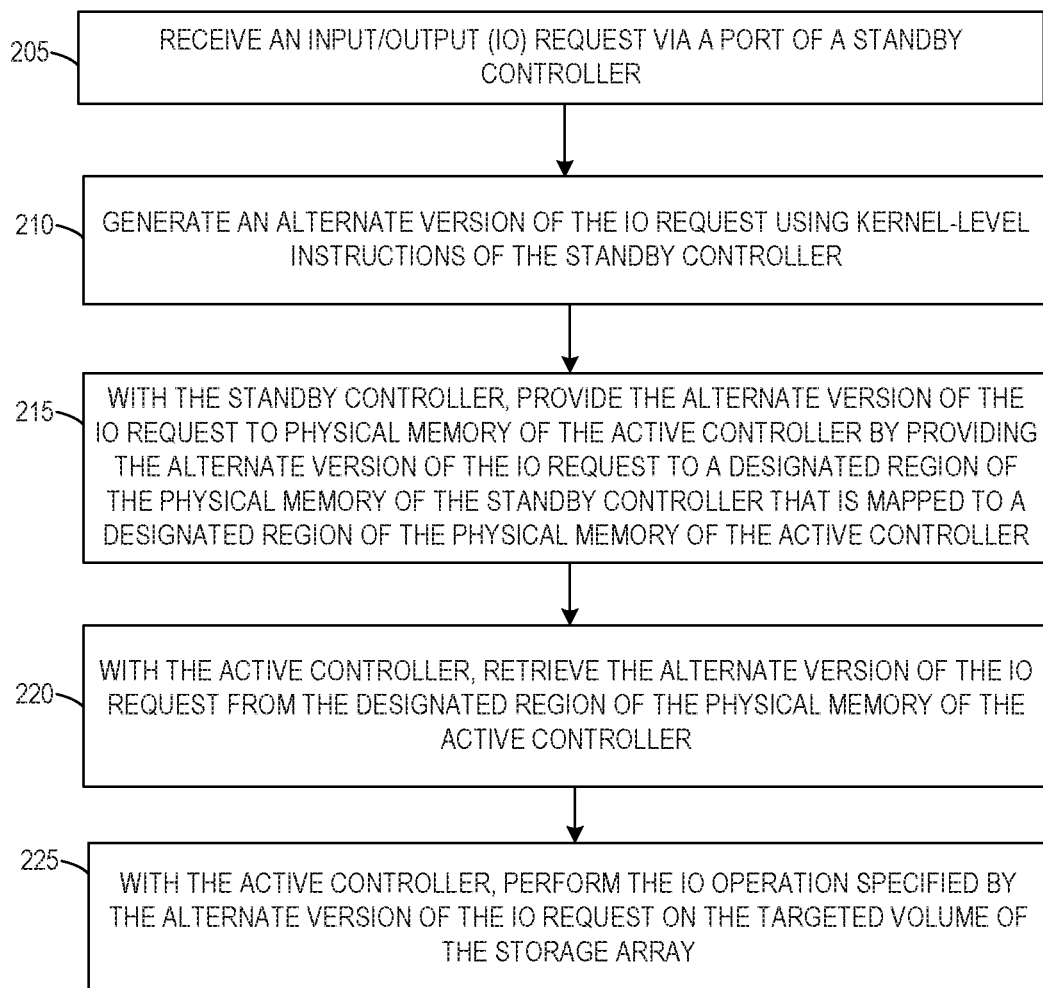
FIG. 2 is a flowchart of an example method that includes providing a version of an IO request to physical memory of an active controller.

Examples are described below in relation to FIGS. 1 and 2. FIG. 2 is a flowchart of an example method 201 to forward an IO request, where the method includes providing a version of an IO request to physical memory of an active controller. Although execution of method 201 is described below with reference to computing system 101 of FIG. 1, other systems suitable for the execution of these methods may be utilized (e.g., computing system 301 of FIG. 3, computing system 501 of FIG. 5, or the like). Additionally, implementation of this method is not limited to such examples. Although the flowchart of FIG. 2 shows a specific order of performance of certain functionalities, the method is not limited to that order. For example, the functionalities shown in succession in the flowchart may be performed in a different order, may be executed concurrently or with partial concurrence, or a combination thereof. In the examples described below, computing system 101 will be referred to as a storage array 101, although it may be any other suitable type of computing system in other examples, as described above.

In the example illustrated in FIG. 1, controller 100 may be configured to operate as an active controller (referred to as "active" controller 100) that is enabled to perform IO operations on volumes 104 of storage array 101, and controller 200 may be configured to operate as a standby controller (referred to as "standby" controller 200) that is not enabled to perform IO operations on volumes 104. Either of controllers 100 and 200 may be able to operate as an active controller or as a standby controller, and the standby controller may be able to takeover for the active controller when appropriate (e.g., upon failover).

Figure 3:
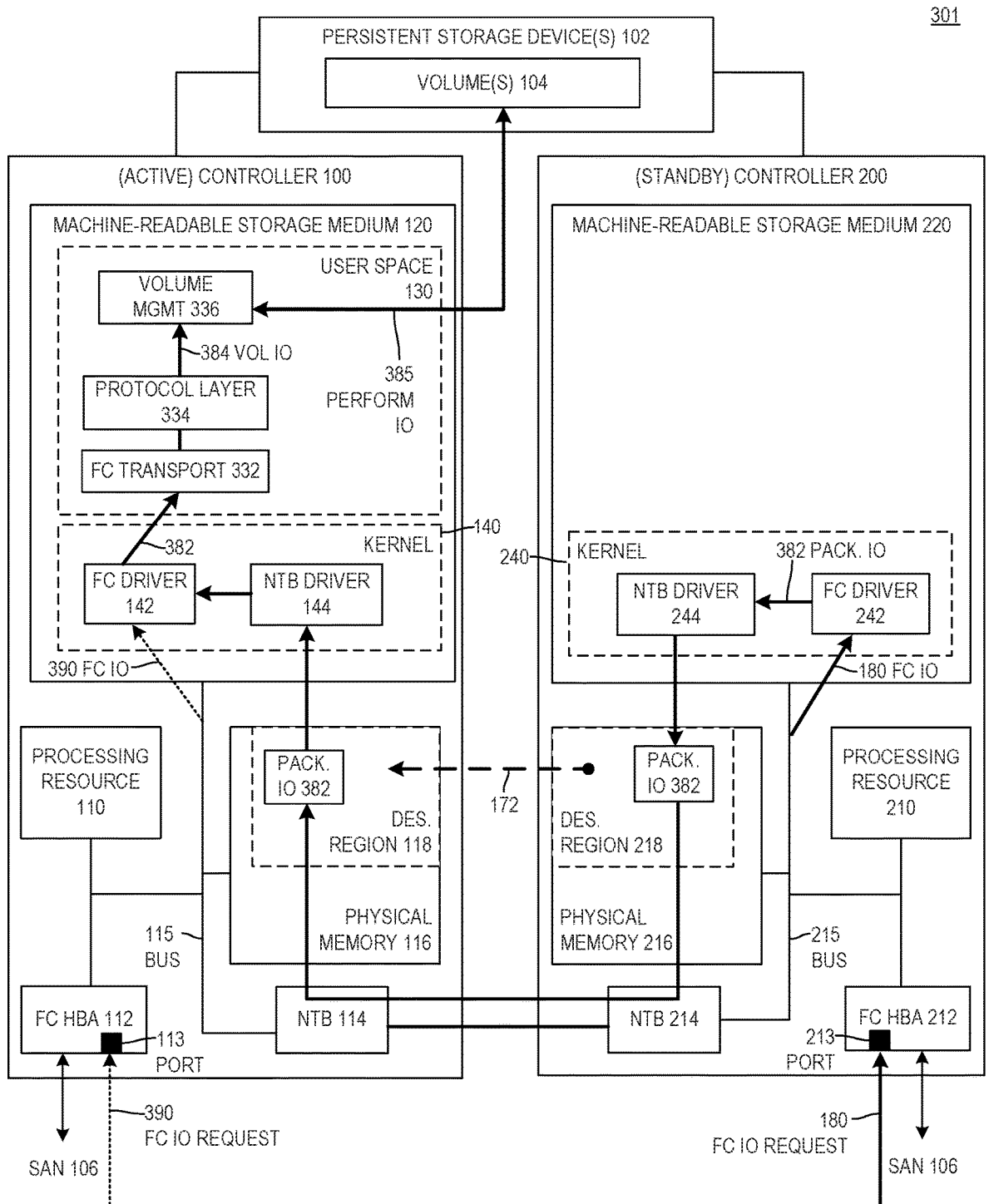
FIG. 3 is a block diagram of an example computing system to transfer a version of an IO request from physical memory of a standby controller to physical memory of an active controller.

Referring to the examples of FIGS. 1 and 2, ports of each of network interface devices 12 and 11 may be in an "active" state (e.g., an ALUA "active optimized" state), such that they are each able to receive IO operations. At 205 of method 201, standby controller 200 may receive an IO request 180 via a port 13 of network interface device 11. In some examples, the IO request 180 may be received from a computer network (e.g., a SAN 106 as illustrated in FIG. 3) to which the network interface device 11 is connected. In some examples, the IO request 180 may be an FC IO request 180 received via an FC port of an HBA (e.g., an FC port 213 of an FC HBA 212, as illustrated in FIG. 3, where the port 13 is an FC port and the interface 11 is an HBA). In other examples, the IO request 180 may be an iSCSI IO request received via a port of a network interface device. IO request 180 may specify an IO operation targeting one of volumes 104 of storage array 101, such as a read or write operation to be performed on one of volumes 104 (e.g., on an address range of a virtual address space of one of volumes 104).

Kernel-level network instructions 41 may acquire (e.g., retrieve) IO request 180 from interface 11, and kernel-level network instructions 41 of standby controller 200 may generate an alternate version 181 of the acquired IO request 180 at 210 of method 201. In some examples, instructions 41 may comprise an FC driver (e.g., FC driver 242 of FIG. 3) that may generate an FC driver version (e.g., version 382 of FIG. 3) of IO request 180, as the alternate version 181. In such examples, the FC driver version may be a packaged version of the IO request 180 that may be packaged (e.g., wrapped, encapsulated, etc.) for an FC driver event queue (and for consumption by at least one user space process of an active controller), as described further below in relation to FIGS. 3-4. In such examples, the alternate version 181 may be generated without involvement of any user space process of standby controller 200. In other examples, kernel-level network instructions 41 and at least one user space process of standby controller 200 may generate the alternate version 181. For example, in such examples the instructions 41 may comprise an FC driver that may generate FC driver version (e.g., a packaged version) of IO request 180, as described above, and at least one user space process of standby controller 200 may generate a user space version 584 (e.g., a volume-level version) of IO request 180 as the alternate version 181 of IO request 180, as described further below in relation to FIGS. 5-6. In other examples, the instructions 41 may comprise kernel-level network stack instructions to communicate between a network interface device 11 and user space Internet Small Computer System Interface (iSCSI) transport instructions of standby controller 200. In such examples, the kernel-level network stack instructions may package or otherwise modify the IO request for consumption by the iSCSI transport instructions. In such examples, at least one user space process of standby controller 200 may generate a user space version 584 (e.g., a volume-level version) of IO request 180 as the alternate version 181 of IO request 180, from the modified version generated by the network stack instructions. In such examples, the at least one user space process of standby controller 200 may include the iSCSI transport instructions.

At 215, standby controller 200 may provide the alternate version 181 of the IO request 180 to physical memory 116 of active controller 100. Standby controller 200 may do so by providing alternate version 181 of IO request 180 to a designated region 218 of physical memory 216 of standby controller 200 that is mapped 172 to a designated region 118 of physical memory 116 of active controller 100. For example, a designated region 218 of physical memory 216 of standby controller 200 may be mapped to a designated region 118 of physical memory 116 of active controller 100 by a hardware bridge device of standby controller 200 and a hardware bridge device of active controller 100. In such examples, the designated regions may be mapped such that, when data is written to the designated region 218 of physical memory 216 of standby controller 200, the hardware bridge device of standby controller 200 may transfer that data to the hardware bridge device of active controller 100, which may in turn store the transferred data to the designated region 118 of physical memory 116 of active controller 100. In some examples, each of the hardware bridge devices may be a PCI bridge device, such as an NTB device (e.g., chip), such as NTB devices 114 and 214 illustrated in FIG. 3, for example.

The hardware bridge devices may establish the mapping of the designated regions 218 and 118 prior to performing method 201, for example. The designated regions 218 and 118 may comprise less than all of respective physical memories 216 and 116, and may provide a mapping from physical memory 216 of standby controller 200 to physical memory 116 of active controller 100 (e.g., from standby controller 200 to active controller 100). In such examples, the mapping of designated memory regions via the hardware bridge devices may enable low-latency communication of IO requests from standby controller 200 to active controller 100.

Returning to 215 of method 201, with the mapping of the designated regions established, a kernel-level process (e.g., a kernel-level transport 244, see FIG. 3) may write the alternate version 181 of the IO request 180 directly to designated region 218 of physical memory 216 (e.g., in examples in which the alternate version 181 is generated without involvement of a user space process). In other examples, at 215, with the mapping of the designated regions established, a user space process may write the alternate version 181 of the IO request 180 to a virtual address space mapped to designated region 218 of physical memory 216 (e.g., in examples in which the alternate version 181 is generated using at least one kernel-level process and at least one user space process). In response, a hardware bridge device of standby controller 200 (e.g., NTB device 214 of FIG. 3) may transfer alternate version 181 of IO request 180 to designated region 118 of physical memory 116 via a hardware bridge device of active controller 100 (e.g., NTB device 114 of FIG. 3). The hardware bridge device of standby controller 200 may also provide an indication (e.g., a doorbell) to the hardware bridge device of active controller 100 (e.g., to a specific register of the hardware bridge device of active controller 100) to indicate that there is new data for active controller 100 to retrieve. In some examples, the active and standby controllers 100 and 200 may use the designated regions 118 and 218 as ring buffers, where the standby controller 200 writes to the next available space in the ring buffer of designated region 218, and active controller 100 reads from the next space in the ring buffer each time it receives the indication (e.g., doorbell) in the specific register.

In some examples, the hardware bridge devices of controllers 100 and 200 may be respective NTB devices 114 and 214 of active and standby controllers 100 and 200. In such examples, the respective kernel-level transport drivers of active and standby controllers 100 and 200 may comprise respective NTB drivers 144 and 244 for the respective NTB devices 114 and 214. In such examples, the respective NTB devices 114 and 214 (together with the respective NTB drivers 144 and 244) may map 172 designated region 218 of 216 physical memory of standby controller 200 to designated region 118 of physical memory 116 of active controller 100.

At 220, active controller 100 may retrieve alternate version 181 of IO request 180 from designated region 118 of physical memory 116 of active controller 100. For example, in response to the doorbell (or other indication), instructions to implement a kernel-level process (e.g., kernel-level transport driver instructions 144 of FIG. 3, etc.) of active controller 100 may retrieve alternate version 181 of IO request 180 from designated region 118 and provide it to kernel-level network instructions 42 (e.g., kernel-level FC driver instructions 142 of FIG. 3) of active controller 100. In other examples, in response to the doorbell (or other indication), instructions 131 to implement at least one user space process of active controller 100 may retrieve alternate version 181 of IO request 180 from a virtual address space mapped to designated region 118.

At 225, active controller 100 may perform 185 the IO operation specified by alternate version 181 of IO request 180 on the targeted volume 104 of storage array 101. In such examples, the alternate version 181 of IO request 180, like IO request 180 itself, may specify the IO operation to be performed (e.g., read, write, etc.), and may specify the targeted location (e.g., virtual address range) of a targeted volume 104 on which to perform the IO operation. For example, as noted above, the alternate version 181 may be a version of IO request 180 that is packaged for an FC driver event queue from which user space instructions 131 may acquire alternate version 181, and perform 185 the IO operation specified by IO request 180 on the targeted volume 104. In this manner, examples described herein may provide an IO request (e.g., a version of the IO request) from a standby controller with active port(s) to an active controller to perform the IO operation specified in the IO request, via a relatively low-latency communication channel.

In some examples, the same hardware bridge devices of may create a second mapping of a different, "return region" of physical memory 116 to a different, "return region" of physical memory 216, such that the hardware bridge devices may transfer data stored to the return region of physical memory 116 to the return region of physical memory 216, in order to provide data (e.g., responses to IO requests) from active controller 100 to standby controller 200. In such examples, after performing 185 the IO operation, user space instructions 131 may return a response to the mapped return region of physical memory 116 (e.g., via a kernel-level process implemented by instructions 140 that may store a version of the response directly to the mapped return region of physical memory 116, or via a virtual address space mapped to the return region of physical memory 116). In response, the hardware bridge device of active controller 100 may transfer the version of the response, via the hardware bridge device of standby controller 200, to the return region of physical memory 216, and send a doorbell to the hardware bridge device of standby controller 200, such that standby controller 200 may retrieve the version of the response (e.g., via a kernel-level instructions 240 or via at least one user space process via a virtual address space mapped to the return region of the physical memory 216). The standby controller may then return the appropriate response to the host that sent IO request 180, via interface 11 (e.g., an HBA 212) and a computer network (e.g., a SAN 106).

FIG. 3 is a block diagram of an example computing system 301 to transfer a version of an IO request from physical memory of a standby controller to physical memory of an active controller. Examples will be described in relation to FIGS. 3 and 4 in which computing system 301 is a storage array 301. However, computing system 301 of FIG. 3 may be any suitable type of computing system (e.g., a server, etc., as described herein). In the example of FIG. 3, storage array 301 may comprise a hardware controller 100, as described above in relation to FIG. 1, and comprising an NTB bridge device 114, a kernel-level NTB transport driver 144 as part of kernel-level instructions 140, and instructions 332, 334, and 336 as part of the user space instructions 130. In the example of FIG. 3, storage array 301 may also comprise a hardware controller 200, as described above in relation to FIG. 1, and comprising an NTB bridge device 214, and a kernel-level NTB transport 244 as part of kernel-level instructions 240. Storage array 301 may comprise one or more persistent storage devices 102 that may include volume(s) 104 and that may be physically accessible by controllers 100 and 200, as described above in relation to FIG. 1.

In the example of FIG. 3, controller 100 (e.g., processing resource 110 of controller 100) may execute instructions 130 and instructions 140 to implement the functionalities described herein in relation to active controller 100 (i.e., when controller 100 is to operate as the active controller). For example, processing resource 110 may execute instructions 130 and 140 to operate hardware controller 100 as an active controller 100 able to perform IO operations on volumes 104 of storage array 301. In the example of FIG. 3, controller 200 (e.g., processing resource 210 of controller 200) may execute instructions (including at least instructions 240) to implement functionalities described herein in relation to standby controller 200 (i.e., when controller 200 is to operate as the standby controller). For example, processing resource 210 may execute instructions to operate hardware controller 200 as a standby controller 200 to forward IO requests to an active controller (e.g., to controller 110 when controller 110 is to operate as the active controller), wherein the standby controller 200 is not itself able to perform IO operations on volumes 104. Either of controllers 100 and 200 may be able to operate as an active controller or as a standby controller, and the standby controller may be able to takeover for the active controller when appropriate (e.g., upon failover). In some examples, controller 200 may also comprise and/or execute instructions equivalent to instructions 130 and 140 to perform the functionalities of the active controller as described herein in relation to active controller 100 (e.g., when controller 200 is to be the active controller, such as after a failover from the active controller, etc.). In some examples, controller 100 may also comprise and/or execute instructions equivalent to those executed by controller 200 (including instructions 240) to perform the functionalities of the standby controller as described herein in relation to standby controller 200 (e.g., when controller 100 is to be the standby controller, such as after a failover from controller 100 to controller 200 as the active controller, etc.). In the example illustrated in FIG. 3, the network interface device 12 of controller 100 may comprise an FC HBA 112 comprising at least one FC port 113, and the network interface device 11 of controller 200 may comprise an FC HBA 212 comprising at least one FC port 213. In such examples, the IO requests received by the FC HBAs may be FC IO requests. In other examples, the network interface devices and ports may receive iSCSI IO requests, as described above. Although the examples illustrated in FIGS. 3-6 are described herein in relation to fibre channel, in other examples, the examples may utilize different protocol(s) (e.g., iSCSI). In such examples, components specific to FC implementation may be replaced with appropriate components for the other protocol(s) (e.g., NICs instead of FC HBAs, appropriate kernel-level instructions, appropriate user space transport instructions, etc.).

In the example of FIG. 3, user space instructions 130 of active controller 100 may include instructions 332, 334, and 336 (which may be part of instructions 131 illustrated in FIG. 1) to be executed by processing resource 110 in user space of controller 100 (e.g., as opposed to kernel space). Any functionalities described herein as performed by any of instructions 332, 334, and 336 may be performed by processing resource 110 executing those instructions (e.g., in user space of controller 100). Kernel-level instructions 140 of standby controller 100 may include kernel-level FC driver instructions 142 and kernel-level bridge device instructions 144, which may include kernel-level transport instructions. In some examples, the instructions 144 may be kernel-level NTB driver instructions 144 for NTB device 114, including kernel-level NTB transport instructions for NTB device 114. The bridge device instructions 144 may be executed by processing resource 110 in kernel space of controller 100 (e.g., as opposed to user space). Any functionalities described herein as performed by kernel-level instructions 140 may be performed by processing resource 110 executing those instructions (e.g., in kernel space of controller 100). Although in the example of FIG. 1, instructions 130 and 140 are illustrated as stored on at least one storage medium 120 of controller 100, in other examples, such instructions may be stored elsewhere (e.g., in whole or in part).

In the example of FIG. 3, kernel-level instructions 240 of standby controller 200 may include kernel-level FC driver instructions 242 and kernel-level bridge device instructions 244, which may include kernel-level transport instructions. In some examples, instructions 41 of FIG. 1 may include instructions 242 and 244. In some examples, the instructions 244 may be kernel-level NTB driver instructions 244 for NTB device 214, including kernel-level NTB transport instructions for NTB device 214. The bridge device instructions 244 may be executed by processing resource 210 in kernel space of controller 200 (e.g., as opposed to user space). Any functionalities described herein as performed by kernel-level instructions 240 may be performed by processing resource 210 executing those instructions (e.g., in kernel space of controller 200). Although in the example of FIG. 3, instructions 240 are illustrated as stored on at least one storage medium 220 of controller 200, in other examples, such instructions may be stored elsewhere (e.g., in whole or in part).

Figure 4:
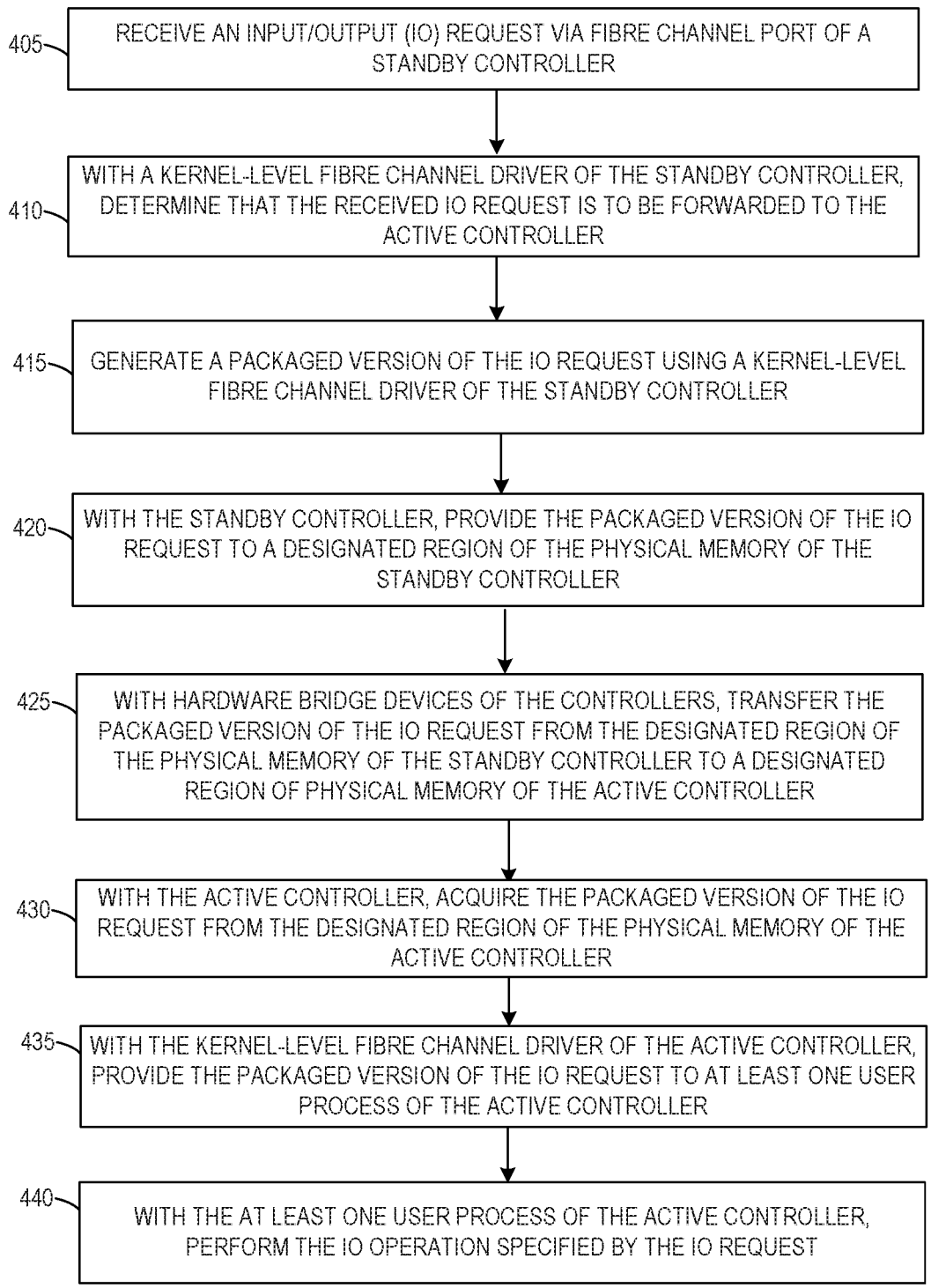
FIG. 4 is a flowchart of an example method that includes transferring a version of an IO request from physical memory of a standby controller to physical memory of an active controller.

Examples are described below in relation to FIGS. 3 and 4. FIG. 4 is a flowchart 401 of an example method that includes transferring a version of an IO request from physical memory of a standby controller to physical memory of an active controller. Although execution of method 401 is described below with reference to computing system 301 of FIG. 3, other systems suitable for the execution of these methods may be utilized (e.g., computing system 101 of FIG. 1, computing system 501 of FIG. 5, or the like). Additionally, implementation of this method is not limited to such examples. Although the flowchart of FIG. 4 shows a specific order of performance of certain functionalities, the method is not limited to that order. For example, the functionalities shown in succession in the flowchart may be performed in a different order, may be executed concurrently or with partial concurrence, or a combination thereof. In the examples described below, computing system 301 will be referred to as a storage array 301, although it may be any other suitable type of computing system in other examples, as described above.

Referring to the examples of FIGS. 3 and 4, ports of each of HBAs 112 and 212 may be in an "active" state (e.g., an ALUA "active optimized" state), such that they are each able to receive IO operations. At 405 of method 401, standby controller 200 may receive an (FC) IO request 180, as described above, via a (FC) port 213 of (FC) HBA 212 from a host via SAN 106. FC driver 242 may acquire (e.g., retrieve) IO request 180 from HBA 212. For example, FC HBA 212, when it receives (FC) IO request 180 on port 213 may trigger an interrupt that FC driver 242 may service. As described above, the (FC) IO request 180 may specify an IO operation targeting a volume 104 of storage array 301.

At 410, in response to the interrupt, kernel-level FC driver 242 of standby controller 200 may determine that the received IO request 180 is to be forwarded to active controller 100. For example, there may be an indication on standby controller 200 (e.g., a global flag, or the like) that may indicate to FC driver 242 that all IO requests are to be forwarded to the active controller, and FC driver 242 may check that flag (or other indication) to determine that the received IO request 180 is to be forwarded to active controller 100.

At 415, FC driver 242 of standby controller 200 may generate an alternate version of the acquired IO request 180. For example, the alternate version may be a packaged version 382 of IO request 180 generated by FC driver 242 from the received IO request 180. As described above, the packaged version 382 may be a version of IO request 180 packaged (e.g., wrapped, encapsulated, etc.) for placement on an event queue of a FC driver.

At 420, after generation of the packaged version 382 and based on the determination at 410, FC driver 242 may provide packaged version 382 of IO request 180 to designated region 218 of physical memory 216 of standby controller 200 via (e.g., using) a kernel-level transport (e.g., an NTB transport) of driver 244. For example, FC driver 242 may provide packaged version 382 of IO request 180 to the kernel-level transport of driver 244 of standby controller 200, and the kernel-level transport of driver 244 may write the packaged version 382 to designated region 218 of physical memory 216 (e.g., directly, and not through any virtual addresses mapped to the physical memory).

In the example of FIG. 3, designated region 218 of physical memory 216 of standby controller 200 may be mapped 172 to designated region 118 of physical memory 116 of active controller 100 by a hardware bridge device (e.g., NTB device 214) of standby controller 200 and a hardware bridge device (e.g., NTB device 114) of active controller 100, as described above in relation to FIG. 1. Although the examples of FIGS. 3 and 4 are described herein in relation to NTB devices 214 and 114, in other examples any other suitable type of hardware bridge devices (e.g., PCI bridge devices) may be used.

NTB devices 214 and 114 may establish the mapping 172 of the designated regions 218 and 118 prior to performing method 401, for example. The designated regions 218 and 118 may comprise less than all of respective physical memories 216 and 116, and may provide a mapping from physical memory 216 of standby controller 200 to physical memory 116 of active controller 100 (e.g., from standby controller 200 to active controller 100). In such examples, the mapping 172 of designated memory regions via the hardware bridge devices may enable low-latency communication of IO requests from standby controller 200 to active controller 100.

Returning to method 401, at 425, with the mapping 172 of the designated regions established, and in response to the packaged version 382 being written to designated region 218, the NTB device 214 of standby controller 200 may transfer packaged version 382 of IO request 180 to designated region 118 of physical memory 116 via NTB device 114 of active controller 100. As described above, NTB device 214 of standby controller 200 may also provide an indication (e.g., a doorbell) to NTB device 114 of active controller 100 to indicate that there is new data for active controller 100 to retrieve, and the active and standby controllers 100 and 200 may use the designated regions 118 and 218 as ring buffers. In some examples, rather than a doorbell, standby controller 200 may send the active controller 100 an indication that there is new data to retrieve, via an alternate communication technique (e.g., via TCP/IP). In other examples, active controller may poll the designated region 118 repeatedly to check for new data (e.g., written to the next location of a ring buffer implemented in the designated region 118).

At 430, in response to a determination that there is new data in designated region 118 (e.g., via any of the above techniques, or the like), kernel-level transport instructions of NTB driver 144 of active controller 100 may retrieve the packaged version 382 of IO request 180 from designated region 118 of physical memory 116 of active controller 100. In such examples, FC driver 142 may acquire the packaged version 382 of IO request 180 from the kernel-level transport instructions of NTB driver 144. At 435, FC driver 142 may provide the packaged version 382 of IO request 180 to at least one user space process of active controller 100. For example, FC driver 142 may add the packaged version 382 of IO request 180 to an event queue of FC driver 142, from which the at least one user space process may retrieve the packaged version 382 for performance of the specified IO operation. In such examples, the FC driver 142 is able to add the packaged version 382 to an event queue without itself performing the processing to appropriately package the IO request 180 for addition to the event queue, since the FC driver 242 on the standby controller packaged the IO request 180 prior to providing it to the active controller. In this manner, examples described herein may utilize resources of standby controller 200 to perform some of the processing of an IO request that may otherwise be done by the active controller. In this manner, examples described herein may distribute some of the processing load of IO requests to the standby controller 200.

At 440, user space instructions 130 may perform the IO operation, which is specified by the packaged version 382 the IO request 180, on the targeted volume 140 of storage array 301. For example, in response to packaged version 382 of IO request 180 being added to an event queue of FC driver 142, FC transport instructions 332 of active controller 100 may retrieve the packaged version 382 from the event queue, provide a modified version of the IO request 180 to protocol layer instructions 334 of active controller 100 (e.g., a version with FC transport wrapper(s) removed, and/or otherwise prepared for processing by the protocol layer instructions 334). The protocol layer instructions 334 may implement a protocol layer for any suitable protocol, such as a Small Computer System Interface (SCSI) protocol, a non-volatile memory (NVM) Express (NVMe) protocol, or the like. In some examples, the protocol layer instructions 334 may transform the modified version of IO request 180 from a protocol-level request to a volume-level IO request 384 (i.e. to generate a volume-level version 384 of IO request 180 from the packaged version 382). For example, in the case of SCSI, the version of the IO request 180 may be expressed in terms of a logical unit number (LUN) and a logical block address (LBA), and the protocol layer instructions 334 may transform that to a volume-level IO request 384 expressed in terms of volume(s) and offset(s) that are useable by volume management instructions 336 of active controller 100 to perform the IO operation specified by the IO request 180. In such examples, the at least one user space process may include the processes implemented by one or more of the FC transport instructions 332, the protocol layer instructions 334, and the volume management instructions 336, and at 440, performing the IO operation may include instructions 332, 334, and 336 transforming the packaged version 382 of IO request 180 to the volume-level IO request 384, and performing 385 the volume-level IO request 384 with the volume management instructions 336 of the active controller 100 on the targeted volume 104, as specified by IO request 180. In examples described herein, a user space process of active controller 100 may be any process, functionality, action, component, etc., implemented by user space instructions 130 executed in a user space environment of active controller 100 (e.g., implemented by user space instructions 130 of the example of FIG. 3).

The example of FIG. 3 may also return responses to IO requests from active controller 100 to standby controller 200, and then from standby controller 200 to the host that provided the IO request. This may be performed in a manner similar to that described above in relation to FIG. 1. For example, in the example of FIG. 3, NTB devices 114 and 214 of may create a second mapping (not shown) of different "return regions" of physical memories 116 and 216, such that when data is stored to the return region of physical memory 116, NTB device 114 may transfer the data to the return region of physical memory 216 via NTB device 214. This path may be used to provide responses to IO requests from active controller 100 to standby controller 200. For example, after performing the IO operation 385, user space instructions 130 may return a response (e.g., read data, acknowledgement of write completion, etc.) to FC driver 142, and FC driver 142 may in turn store the response (or a version thereof) to the return region of physical memory 116 via kernel-level transport instructions (e.g., of NTB driver 144). Based on the mapping described above, NTB device 114 of active controller 100 may transfer the response to the return region of physical memory 216 via NTB device 214, and send a doorbell to standby controller 200 (or otherwise notify standby controller 200) of the availability of new data in the return region of physical memory 216. Kernel-level transport instructions (e.g., of NTB 244) may then retrieve the response (version) stored in the return region, and FC driver 242 may then return the appropriate response to the host that sent IO request 180, via HBA 212 and SAN 106.

In examples described herein, IO requests may also be received via active ports of active controller 100 and then processed by active controller 100. For example, (FC) HBA 112 of active controller may comprise active (FC) ports (e.g., in an "active optimized" state), such as an (FC) port 113, on which active controller 100 may receive an (FC) IO request 390 from a host via SAN 106. In such examples, FC driver 142 may acquire the IO request 390 from HBA 112, and may generate an FC driver version 382 (e.g., a packaged version 382) of IO request 180 (as described above in relation to FC driver 242). In such examples, FC driver 142 may provide the driver version 382 to the at least one user space process of instructions 130 and the at least one user space process may perform the IO operation 382, as described above in relation to IO request 180. In such examples, a response may be returned from the at least one user space process to FC driver 142, as described above, and FC driver 142 may then return the response (or a version thereof) to the host that sent the IO request 190 via SAN 106, using HBA 112 and port 113.

In examples described herein, each kernel-level FC driver, when it starts up, may perform device discovery (e.g., a PCI probe) to discover available hardware on its controller, including the available ports of the controller on which it runs. In such examples, each FC driver of a respective controller may then inform another FC driver (of another controller) of the ports that it discovered on its controller (e.g., via the hardware bridge devices, as described above). In this manner, an active controller may determine the ports that are local to the active controller, and those which are remote (e.g., located on a standby controller). In such examples, the active controller may use this port information to determine whether an IO response is to be provided to a host via a local port (e.g., if the IO request was received via a local port) or is to be sent to the another controller (e.g., a standby controller), such as when the IO request was received from a host via a remote port of the other (e.g., standby) controller.

In the above examples described above in relation to FIGS. 3 and 4, IO requests 180 may be provided from a standby controller 200 to an active controller 100 via kernel-level functionalities (e.g., kernel-level driver and transport instructions) of the standby controller 200 and without using any user space functionalities of the standby controller 200. Similarly, responses to such IO requests 180 may be received by the standby controller 200 and output back to the host using kernel-level functionalities of the standby controller 200 and without using any user space functionalities of the standby controller 200. Such examples may provide IO requests from the standby controller 200 to the active controller 100 with relatively low latency, as the standby controller 200 may communicate IO requests 180 to active controller 100 utilizing kernel-level functionalities, without any mode switch from kernel mode to user space mode on the standby controller 200. The standby controller 200 may similarly communicate responses with kernel-level functionalities, without any mode switch to user space on standby controller 200. This benefit is in addition to the benefits of the low-latency communication between the active and standby controllers 100 and 200 provided by using the mapped physical memory regions (e.g., via hardware bridge devices, such as NTB devices), as described above. In addition, such examples may be implemented without changes to the user space process(es) of either the active controller 100 or the standby controller. In addition, as described above, resources of the standby controller 200 may be used to perform some processing of IO requests which may contribute to improved performance of the system 301. For example, FC driver 242 of standby controller 200 may generate the packaged version 382 from the IO request 180, which may offload that functionality from the FC driver 142 of the active controller 100, which may otherwise perform that functionality.

Figure 5:
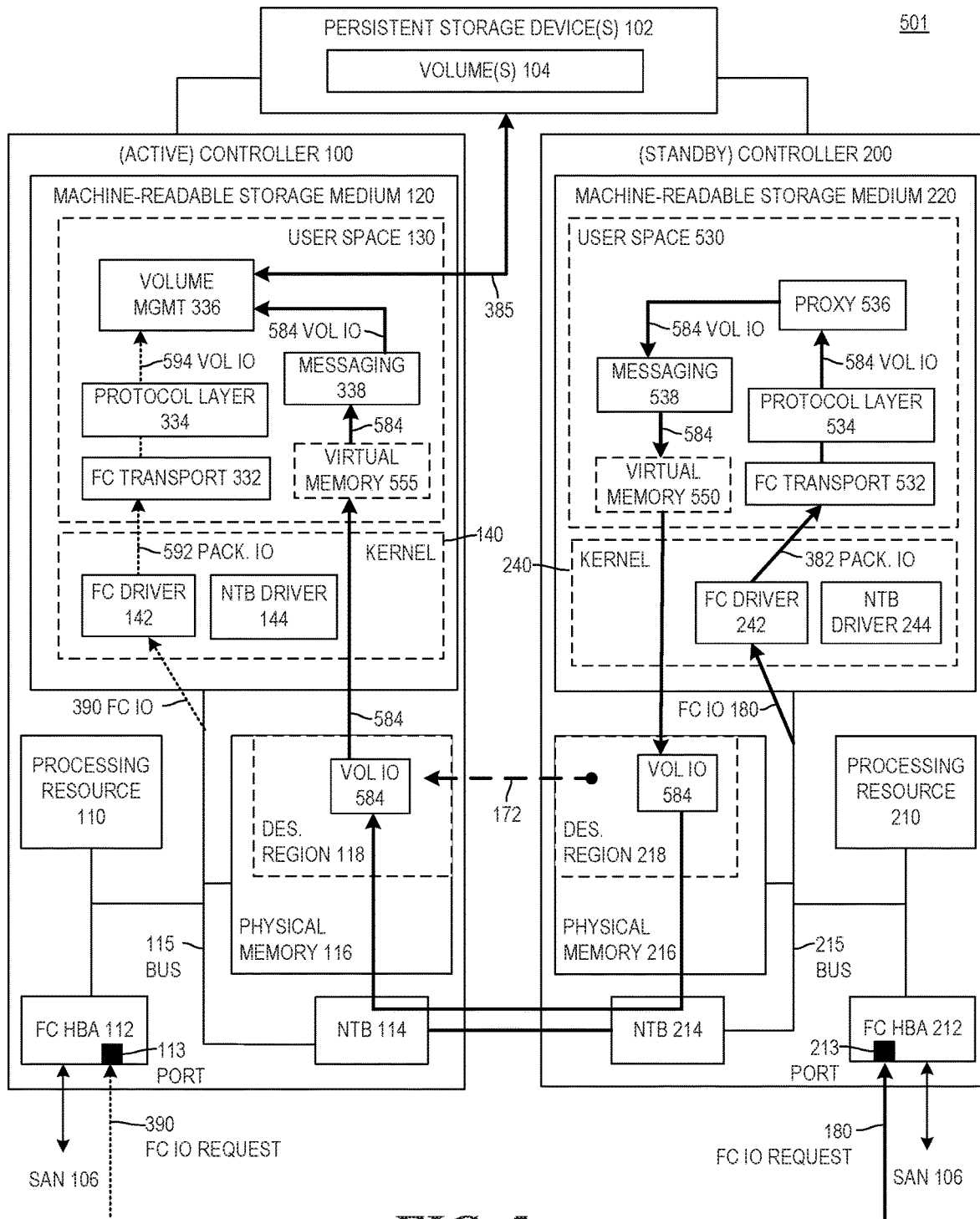
FIG. 5 is block diagram of an example computing system to write a user space version of an IO request to a designated region of physical memory of a standby controller.

FIG. 5 is block diagram of an example computing system 501 to write a user space version of an IO request to a designated region of physical memory of a standby controller. Examples will be described in relation to FIGS. 5 and 6 in which computing system 501 is a storage array 501. However, computing system 501 of FIG. 5 may be any suitable type of computing system (e.g., a server, etc., as described herein). In the example of FIG. 5, storage array 501 may comprise a hardware controller 100, as described above in relation to FIG. 3, and further comprise messaging instructions 338 as part of the user space instructions 130. In the example of FIG. 5, storage array 501 may also comprise a hardware controller 200, as described above in relation to FIG. 3, and further comprise user space instructions 530. Storage array 501 may comprise one or more persistent storage devices 102 that may include volume(s) 104 and that may be physically accessible by controllers 100 and 200, as described above in relation to FIG. 1.

In the example of FIG. 5, controller 100 (e.g., processing resource 110 of controller 100) may execute instructions 130 and instructions 140 to implement the functionalities described herein in relation to active controller 100 (i.e., when controller 100 is to operate as the active controller). For example, processing resource 110 may execute instructions 130 and 140 to operate hardware controller 100 as an active controller 100 able to perform IO operations on volumes 104 of storage array 501. In the example of FIG. 5, controller 200 (e.g., processing resource 210 of controller 200) may execute instructions (including at least instructions 240 and 530) to implement functionalities described herein in relation to standby controller 200 (i.e., when controller 200 is to operate as the standby controller). For example, processing resource 210 may execute instructions to operate hardware controller 200 as a standby controller 200 to forward IO requests to an active controller (e.g., to controller 110 when controller 110 is to operate as the active controller), wherein the standby controller 200 is not itself able to perform IO operations on volumes 104. Either of controllers 100 and 200 may be able to operate as an active controller or as a standby controller, and the standby controller may be able to takeover for the active controller when appropriate (e.g., upon failover). In some examples, controller 200 may also comprise and/or execute instructions equivalent to instructions 130 and 140 to perform the functionalities of the active controller as described herein in relation to active controller 100 (e.g., when controller 200 is to be the active controller, such as after a failover from the active controller, etc.). In some examples, controller 100 may also comprise and/or execute instructions equivalent to those executed by controller 200 (including instructions 240 and 530) to perform the functionalities of the standby controller as described herein in relation to standby controller 200 (e.g., when controller 100 is to be the standby controller, such as after a failover from controller 100 to controller 200 as the active controller, etc.)

In the example of FIG. 5, user space instructions 130 of active controller 100 (including instructions 332, 334, 336, and 338, which may be part of instructions 131 illustrated in FIG. 1), may be executed by processing resource 110 in user space of controller 100 (e.g., as opposed to kernel space). Any functionalities described herein as performed by any of instructions 332, 334, 336, and 338 may be performed by processing resource 110 executing those instructions (e.g., in user space of controller 100). Kernel-level instructions 140 (including kernel-level FC driver instructions 142 and kernel-level bridge device instructions 144) may be executed by processing resource 110 in kernel space of controller 100 (e.g., as opposed to user space). Any functionalities described herein as performed by kernel-level instructions 140 may be performed by processing resource 110 executing those instructions (e.g., in kernel space of controller 100). Although instructions 130 and 140 are illustrated as stored on at least one storage medium 120 of controller 100 in the example of FIG. 1, such instructions may be stored elsewhere (e.g., in whole or in part) in other examples.

In the example of FIG. 5, kernel-level instructions 240 (including instructions 242 and 244) may be executed by processing resource 210 in kernel space of controller 200 (e.g., as opposed to user space). Any functionalities described herein as performed by kernel-level instructions 240 may be performed by processing resource 210 executing those instructions (e.g., in kernel space of controller 200). User space instructions 530 (including instructions 532, 534, 536, and 538) may be executed by processing resource 210 in user space of controller 200 (e.g., as opposed to kernel space). Any functionalities described herein as performed by user space instructions 530 may be performed by processing resource 210 executing those instructions (e.g., in user space of controller 200). Although in the example of FIG. 5, instructions 240 and 530 are illustrated as stored on at least one storage medium 220 of controller 200, in other examples, such instructions may be stored elsewhere (e.g., in whole or in part).

Figure 6:
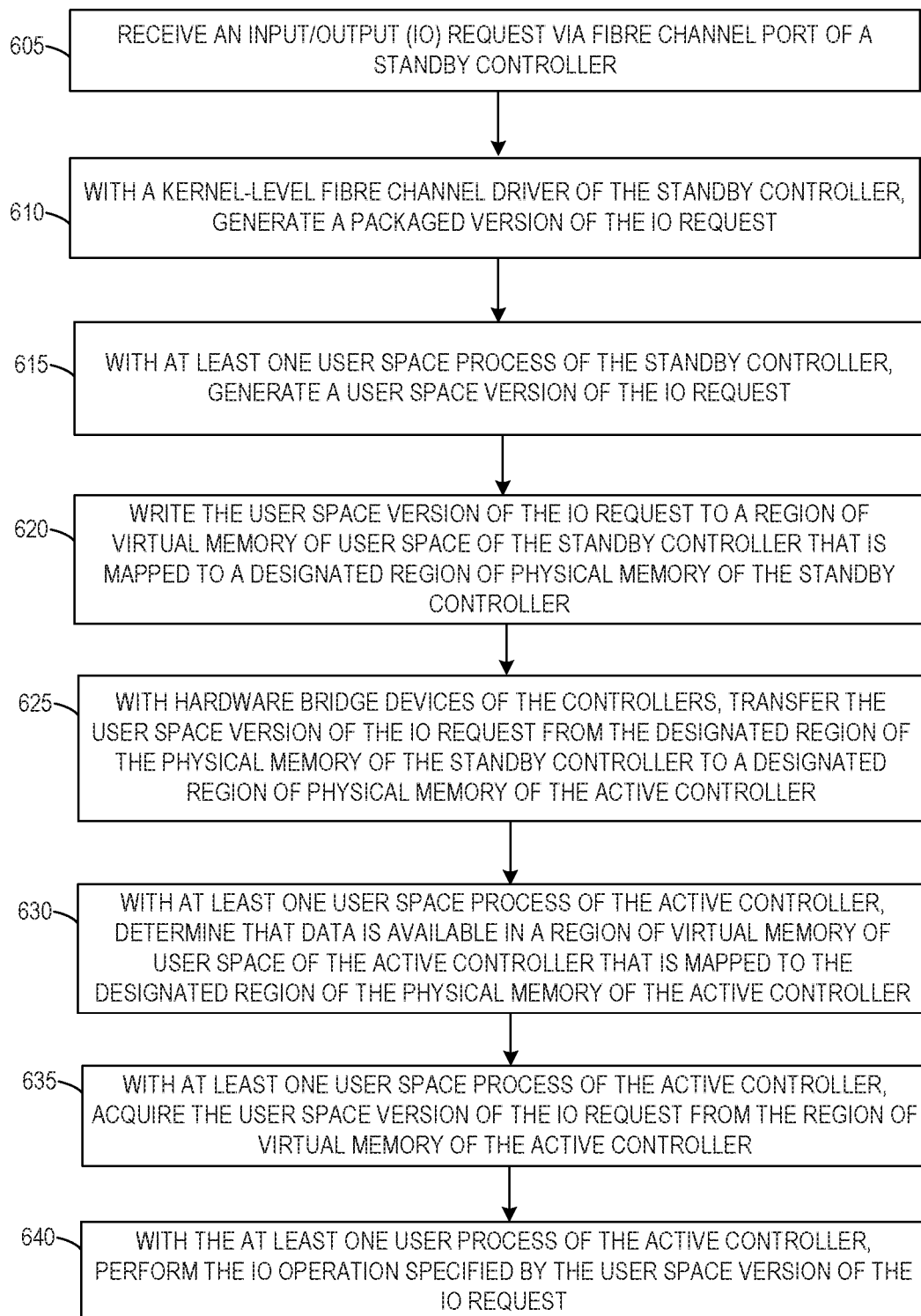
FIG. 6 is a flowchart of an example method that includes writing a user space version of an IO request to a designated region of physical memory of a standby controller.

Examples are described below in relation to FIGS. 5 and 6. FIG. 6 is a flowchart of an example method 601 that includes writing a user space version of an IO request to a designated region of physical memory of a standby controller. Although execution of method 601 is described below with reference to computing system 501 of FIG. 5, other systems suitable for the execution of these methods may be utilized (e.g., computing system 101 of FIG. 1, computing system 301 of FIG. 3, or the like). Additionally, implementation of this method is not limited to such examples. Although the flowchart of FIG. 6 shows a specific order of performance of certain functionalities, the method is not limited to that order. For example, the functionalities shown in succession in the flowchart may be performed in a different order, may be executed concurrently or with partial concurrence, or a combination thereof. In the examples described below, computing system 501 will be referred to as a storage array 501, although it may be any other suitable type of computing system in other examples, as described above.

Although the examples illustrated in FIGS. 3-6 are described herein in relation to fibre channel, in other examples, the examples may utilize different protocol(s) (e.g., iSCSI). In such examples, components specific to FC implementation may be replaced with appropriate components for the other protocol(s) (e.g., NICs instead of FC HBAs, appropriate kernel-level instructions, appropriate user space transport instructions, etc.). Referring to the examples of FIGS. 5 and 6, ports of each of HBAs 112 and 212 may be in an "active" state (e.g., an ALUA "active optimized" state), such that they are each able to receive IO operations. At 605 of method 601, standby controller 200 may receive an FC IO request 180, as described above, via a FC port 213 of FC HBA 212 from a host via SAN 106. FC driver 242 may acquire (e.g., retrieve) IO request 180 from HBA 212. For example, FC HBA 212, when it receives FC IO request 180 on port 213 may trigger an interrupt that FC driver 242 may service (e.g., including retrieving the IO request 180). As described above, the FC IO request 180 may specify an IO operation targeting a volume 104 of storage array 501. In the examples of FIGS. 5 and 6, FC driver 242 and at least one user space process of standby controller 200 may generate an alternate version of the acquired IO request 180. For example, FC driver 242 and at least one user space process of standby controller 200 may generate a user space version of IO request 180 as the alternate version, and the at least one user space process of the standby controller 200 may provide the alternate version of the IO request 180 to a designated region 218 of physical memory 216 of standby controller 200, as described below.

For example, at 610, FC driver 242 of standby controller 200 may generate an FC driver version of IO request 180, which may be a packaged version 382 of IO request 180 generated by FC driver 242 from the received IO request 180. As described above, the packaged version 382 may be a version of IO request 180 packaged (e.g., wrapped, encapsulated, etc.) for placement on an event queue of a FC driver. In such examples, FC driver 242 may add the packaged version 382 to an event queue of FC driver 242 (i.e., an event queue for port 213) to thereby provide the packaged version 382 of IO request 180 to the at least one user space process of standby controller 200. In such examples, the at least one user space process of standby controller 200 (e.g., implemented by instructions 530) may acquire the packaged version 382 of IO request 180 from the event queue of FC driver 242.

At 615, the at least one user space process of standby controller 200 may generate a user space version of the IO request from the packaged version 382 (i.e., the FC driver version) of IO request 180. For example, in response to packaged version 382 of IO request 180 being added to an event queue of FC driver 242, FC transport instructions 532 of standby controller 200 (which may be similar to FC transport instructions 532) may retrieve the packaged version 382 from the event queue, provide a modified version of the IO request 180 to protocol layer instructions 534 of standby controller 200 (e.g., a version with FC transport wrapper(s) removed, and/or otherwise prepared for processing by the protocol layer instructions 534). The protocol layer instructions 534 (which may be similar to protocol layer instructions 334) may implement a protocol layer for any suitable protocol, such as a SCSI protocol (e.g., iSCSI), an NVMe protocol, or the like. In some examples, the protocol layer instructions 534 may transform the modified version of IO request 180 from a protocol-level request to a volume-level version 584 of IO request 180 (i.e., to generate a volume-level version 584 from the packaged version 382). For example, in the case of SCSI, the version of the IO request 180 may be expressed in terms of a logical unit number (LUN) and a logical block address (LBA), and the protocol layer instructions 534 may transform that to a volume-level IO request 584 expressed in terms of volume(s) and offset(s) that are useable by volume management instructions 336 of active controller 100 to perform the IO operation specified by the IO request 180.

The protocol layer instructions 534 may provide the volume-level IO request 584 to volume management proxy instructions 536, which may be user space instructions of standby controller 530 that are not themselves able to perform IO operations on volumes 104, but instead are to provide IO requests (e.g., volume-level IO requests 584) to user space instructions 130 of active controller 100 to perform the specified IO operations. Protocol layer instructions 534 may utilize user space messaging instructions 538 of standby controller 200 to provide IO requests to active controller 100, as will be described below.

NTB devices 114 and 214, and NTB drivers 144 and 244, may establish mapping 172 of designated region 218 of physical memory 216 to designated region 118 of physical memory 116, as described above. As also described above, user space may refer to an unprivileged mode of operation of a processing resource in which the processing resource is able to access at least a portion of physical memory to which virtual memory assigned to the user space is mapped. For example, user space of standby controller 200 may be assigned virtual memory addresses that are mapped to at least a portion of physical memory 216, and user space of active controller 100 may be assigned virtual memory addresses that are mapped to at least a portion of physical memory 116.

In the example of FIG. 5, prior to performance of method 601, NTB driver 244 may map virtual memory addresses 550 to the designated region 218, such that user space process(es) may write to the designated region 218 of physical memory 216 using the mapped virtual memory addresses 550. The virtual memory addresses 550 may be a subset of the virtual memory addresses assigned to user space of standby controller 200. In such examples, also prior to performance of method 601, NTB driver 144 may map virtual memory addresses 555 to the designated region 118, such that user space process(es) may read from the designated region 118 of physical memory 116 using the mapped virtual memory addresses 555. The virtual memory addresses 555 may be a subset of the virtual memory addresses assigned to user space of active controller 100. In such examples, an NTB driver may provide a memory mapping system call (e.g., such as an "mmap( )" system call) to provide a virtual mapping of a region of physical memory. Such a functionality may be used to established virtual memory regions 550 and 555, for example.

Returning to method 601, at 620, messaging instructions 538 may write the volume-level version 584 of IO request 180 to designated region 218 of physical memory 216 of standby controller 200 by writing the volume-level version 584 to a region of virtual memory addresses 550 that are mapped to designated region 218. As described above, designated region 218 of physical memory 216 of standby controller 200 may be mapped 172 to designated region 118 of physical memory 116 of active controller 100 by NTB device 214 (or another type of hardware bridge device) of standby controller 200 and NTB device 114 (or another type of hardware bridge device) of active controller 100. Although the examples of FIGS. 5 and 6 are described herein in relation to NTB devices 114 and 214, in other examples any other suitable type of hardware bridge devices (e.g., PCI bridge devices) may be used.

At 625, with the mapping 172 of the designated regions established, and in response to the volume-level version 584 being written to designated region 218, the NTB device 214 of standby controller 200 may transfer volume-level version 584 of IO request 180 to designated region 118 of physical memory 116 via NTB device 114 of active controller 100. As described above, NTB device 214 of standby controller 200 may also provide an indication (e.g., a doorbell) to NTB device 114 of active controller 100 to indicate that there is new data for active controller 100 to retrieve, and the active and standby controllers 100 and 200 may use the virtual memory regions 550 and 555 (and the designated regions 218 and 118 to which they are mapped) as ring buffers. In some examples, rather than a doorbell, standby controller 200 may send the active controller 100 an indication that there is new data to retrieve, via an alternate communication technique (e.g., via an out-of-band signal over an auxiliary TCP/IP connection, which may have a higher response time but consume less processing resources). In other examples, active controller may repeatedly poll the designated region 118 (via virtual memory addresses 555) to check for new data (e.g., written to the next location of a ring buffer implemented in the virtual memory addresses 555 and designated region 118).

At 630, at least one user space process of active controller 100 may determine that data is available in virtual memory region 555 of user space of active controller 100 that is mapped to designated region 118 of physical memory 116 of active controller 100. For example, at least one user space process of active controller 100 may make this determination based on any of the techniques discussed above, or the like, such as a doorbell, polling region 555, an out-of-band indication, or the like.

In response to the determination, at 635, the at least one user space process of active controller 100 may acquire volume-level version 584 of IO request 180 from the virtual memory region 555 of active controller 100. For example, messaging instructions 338 of user space instructions 130 of active controller 100 may retrieve volume-level version 584 of IO request 180 from designated region 118 via the virtual memory addresses of virtual memory region 555 of active controller 100. In such examples, messaging instructions 338 may provide volume-level version 584 to volume management instructions 336, which may perform the IO operation, specified by volume-level version 584 of IO request 180, on the targeted volume 104 of storage array 501, at 640.

In such examples, the system is able to offload much processing of IO request 180 to the standby controller 200 before the processed version is transferred to the active controller for performance of the IO request 180 at 640. In some examples described herein, this offloading of some processing to the standby controller may enable the system to achieve higher performance. For example, in the example of FIGS. 5 and 6, FC driver 242 is able to package IO request 180 for addition to an FC driver event queue, so an FC driver of the active controller 100 may be relieved of that processing for the IO request 180, and the at least one user space process of standby controller are also able to generate the volume-level version 584 of IO request 180, so user space process(es) of active controller 100 may be relieved of that processing for IO request 180. In such examples, volume management instructions 336 of active controller 100 are able to perform the IO operation specified by the volume-level version 584. In this manner, examples described herein may utilize resources of standby controller 200 to perform some of the processing of an IO request that may otherwise be done by the active controller 100. In this manner, examples described herein may distribute some of the processing load of IO requests to the standby controller 200, which may improve performance. In addition, the mapping 172 of designated memory regions via the hardware bridge devices may enable low-latency communication of IO requests from standby controller 200 to active controller 100. Examples described above in relation to FIGS. 5 and 6 may also be flexibly used with different protocols, such as iSCSI.

The example of FIG. 5 may also return responses to IO requests from active controller 100 to standby controller 200, and then from standby controller 200 to the host that provided the IO request. For example, in the example of FIG. 5, NTB devices 114 and 214 may create a second mapping (not shown) of different "return regions" of physical memories 116 and 216, such that when data is stored to the return region of physical memory 116, NTB device 114 may transfer the data to the return region of physical memory 216 via NTB device 214, as described above. This path may be used to provide responses to IO requests from active controller 100 to standby controller 200. For example, after performing the IO operation 385, user space instructions 130 may return a response (e.g., read data, acknowledgement of write completion, etc.), via messaging instructions 338, to a return region of virtual memory (i.e., different than virtual memory region 555) that is mapped to the return region of physical memory 116. Based on the mapping described above, NTB device 114 of active controller 100 may transfer the response to the return region of physical memory 216 via NTB device 214, and send a doorbell to standby controller 200 (or otherwise notify standby controller 200) of the availability of new data in the return region of physical memory 216. In such examples, messaging instructions 538 may read the response from a return region of virtual memory (different than virtual memory region 550) that is mapped to the return region of physical memory 216. In such examples, the at least one user space process of standby controller may then return the response (or a version thereof) to the host that sent IO request 180, FC driver 242, HBA 212, and SAN 106.

Some examples may also improve performance by storing data of incoming writes to the non-volatile RAM (NVRAM) of the standby controller 220 before transferring such writes (IO requests 180) to the active controller. For example, when a write is performed by an active controller 100, the data is first written to NVRAM before being flushed to persistent storage device(s) 102. In such examples, the data to be written is also mirrored to NVRAM of the standby controller 200, in case of a failure of the active controller (e.g., prior the data being flushed to the persistent storage device(s) 102). In some cases, that could involve two transfers of the same write data, first a transfer of the data with IO request 180 from standby controller 200 to active controller 100, and then after the active controller 100 writes the data to its NVRAM, mirroring the data (that was already received at standby controller 200) to NVRAM of the standby controller. However, in some examples described herein, before sending a version of IO request 180 to active controller 100, the at least one user space process of standby controller 200 (e.g., proxy 536) may store the write data of a write request to NVRAM of standby controller 200 before providing a version of the IO request 180 (e.g., volume-level version 584) to active controller 100, as described above in relation to examples of FIGS. 5 and 6. In such examples, the active controller may receive the IO request, and store the write data to its NVRAM, but may avoid sending that same data back to the NVRAM of the standby controller 200, since it was already stored to NVRAM of standby controller 200.

In examples described herein, IO requests may also be received via active ports of active controller 100 and then processed by active controller 100. For example, FC HBA 112 of active controller 100 may comprise active FC ports (e.g., in an "active optimized" state), such as an FC port 113, on which active controller 100 may receive an FC IO request 390 from a host via SAN 106. In such examples, FC driver 142 may acquire the IO request 390 from HBA 112, and may generate an FC driver version 592 (e.g., a packaged version 592) of IO request 390 (as described above in relation to FC driver 242). In such examples, FC driver 142 may provide the driver version 592 to the at least one user space process of instructions 130 (e.g., via an event queue of FC driver 142), which may generate a volume-level version 594 from the driver version 592, and then perform the IO operation 385 specified by the volume-level version 594. In such examples, a response may be returned from the at least one user space process to FC driver 142, as described above, and FC driver 142 may then return the response (or a version thereof) to the host that sent the IO request 390 via SAN 106, using HBA 112 and port 113.

In examples described herein in relation to FIGS. 5 and 6, the at least one user space process of standby controller 200 may include one or more of the processes implemented by one or more of FC transport instructions 532, the protocol layer instructions 534, and volume management proxy instructions 536, and messaging instructions 538. For example, a user space process of standby controller 200 may be any process, functionality, action, component, etc., implemented by user space instructions 530 executed in a user space environment of standby controller 200 (e.g., implemented by user space instructions 530 of the example of FIG. 5). In examples described herein, the at least one user space process of active controller 100 may include one or more of the processes implemented by one or more of FC transport instructions 332, the protocol layer instructions 334, and volume management instructions 336, and messaging instructions 338. For example, a user space process of active controller 100 may be any process, functionality, action, component, etc., implemented by user space instructions 130 executed in a user space environment of active controller 100 (e.g., implemented by user space instructions 130 of the example of FIG. 5).

In examples described herein, the phrase "based on" is not exclusive and should not be read as "based exclusively on". Rather, the phrase "based on" as used herein is inclusive and means the same as the alternative phrasing "based at least on" or "based at least in part on". As such, any determination, decision, comparison, or the like, described herein as "based on" a certain condition, data, or the like, may be understood to mean that the decision, comparison, or the like, is based at least on (or based at least in part on) that condition, data, or the like, and may also be based on other condition(s), data, or the like. In examples described herein, functionalities described as being performed by "instructions" may be understood as functionalities that may be performed by those instructions when executed by a processing resource. In other examples, functionalities described in relation to instructions may be implemented by one or more engines, which may be any combination of hardware and programming to implement the functionalities of the engine(s).

As used herein, a "computing device" may be a server, storage device, storage array, desktop or laptop computer, switch, router, or any other processing device or equipment including a processing resource. In examples described herein, a processing resource may include, for example, one processor or multiple processors included in a single computing device or distributed across multiple computing devices. As used herein, a "processor" may be at least one of a central processing unit (CPU), a core, a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the examples illustrated herein, storage medium 120 and storage medium 220 may each be implemented by one machine-readable storage medium, or multiple machine-readable storage media. While storage medium 120 is illustrated as separate from physical memory 116, in some embodiments they may be separate, while in other embodiments they may not be separate. While storage medium 220 is illustrated as separate from physical memory 216, in some embodiments they may be separate, while in other embodiments they may not be separate.

In examples described herein, a storage array may be a computing device comprising a plurality of storage devices and one or more controllers to interact with host devices and control access to the storage devices. In some examples, the storage devices may include HDDs, SSDs, or any other suitable type of storage device, or any combination thereof. In some examples, the controller(s) may virtualize the storage capacity provided by the storage devices to enable a host to access a virtual volume made up of storage space from multiple different storage devices.

In other examples, the functionalities described above in relation to instructions described herein may be implemented by one or more engines which may be any combination of hardware and programming to implement the functionalities of the engine(s). In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one of the engine(s). In some examples, the at least one machine-readable storage medium may store instructions that, when executed by the at least one processing resource, at least partially implement some or all of the engine(s). In such examples, a computing device may include the at least one machine-readable storage medium storing the instructions and the at least one processing resource to execute the instructions. In other examples, the engine may be implemented by electronic circuitry.

As used herein, a "machine-readable storage medium" may be any electronic, magnetic, optical, or other physical storage apparatus to contain or store information such as executable instructions, data, and the like. For example, any machine-readable storage medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components. In some examples, instructions may be part of an installation package that, when installed, may be executed by a processing resource to implement functionalities described herein. All of the features disclosed in this specification (including any accompanying claims, abstract and drawings), and/or all of the elements of any method or process so disclosed, may be combined in any combination, except combinations where at least some of such features and/or elements are mutually exclusive. For example, functionalities described herein in relation to any of FIGS. 1-6 may be provided in combination with functionalities described herein in relation to any other of FIGS. 1-6.

What is claimed is:

1. A method of a storage array to forward an input/output (IO) request, the method comprising:
    receiving the IO request via a port of a first controller, the IO request specifying an IO operation targeting a volume of the storage array, and wherein the storage array comprises the first controller and a second controller, the IO request received when the first controller is not enabled to perform IO operations on the targeted volume and the second controller is enabled to perform IO operations on the targeted volume;
    with a protocol driver of the first controller and for a given protocol, generating a packaged version of the IO request that is packaged for placement on an event queue of a protocol driver for the given protocol;

with the first controller, providing the packaged version of the IO request to physical memory of the second controller by providing the packaged version of the IO request to a designated region of physical memory of the first controller that is mapped to a designated region of the physical memory of the second controller;

with the second controller, retrieving the packaged version of the IO request from the designated region of the physical memory of the second controller and adding the retrieved packaged version of the IO request to an event queue of a protocol driver of the second controller and for the given protocol; and with the second controller, performing the IO operation, which is specified by the packaged version of the IO request, on the targeted volume of the storage array.

2. The method of claim 1, comprising:
using respective hardware bridge devices of the first and second controllers, providing the packaged version of the IO request from the designated region of physical memory of the first controller to the designated region of the physical memory of the second controller.

3. The method of claim 2, wherein the hardware bridge devices are respective non-transparent bridge (NTB) devices that map the designated region of the physical memory of the first controller to the designated region of the physical memory of the second controller.

4. The method of claim 1, wherein the protocol driver of the first controller is a kernel-level protocol driver and the protocol driver of the second controller is a kernel-level protocol driver.

5. The method of claim 4, wherein the protocol driver of the first controller and the protocol driver of the second controller are each a kernel-level fibre channel driver.

6. The method of claim 1, further comprising:
in response to the packaged version of the IO request being added to the event queue of the protocol driver of the second controller, performing the IO operation, which is specified by the packaged version of the IO request, on the targeted volume of the storage array using a volume manager of user space of the second controller.

7. The method of claim 1, wherein the first controller is to receive the IO request when the first controller is to operate as a standby controller and the second controller is to operate as an active controller.

8. The method of claim 1, wherein:
the given protocol is fibre channel;
the protocol driver of the first controller is a fibre channel driver; and
the protocol driver of the second controller is a fibre channel driver.

9. A storage array comprising:
a first hardware controller comprising first instructions executable by the first hardware controller; and
a second hardware controller comprising second instructions executable by the second hardware controller;
wherein the first hardware controller is to receive an input/output (IO) request, via a port of the first hardware controller, when the first hardware controller is not enabled to perform IO operations on a volume of the storage array and the second hardware controller is enabled to perform IO operations on the volume of the storage array, the IO request specifying an IO operation targeting the volume of the storage array;
wherein the first instructions comprise a protocol driver, of the first hardware controller, that is for a given protocol and executable by the first hardware controller to generate a packaged version of the IO request that is packaged for placement on an event queue of a protocol driver for the given protocol;
wherein the first instructions are executable by the first hardware controller to:
provide the packaged version of the IO request to physical memory of the second hardware controller by providing the packaged version of the IO request to a designated region of physical memory of the first hardware controller that is mapped to a designated region of the physical memory of the second hardware controller;
wherein the second hardware controller comprises a protocol driver for the given protocol; and
wherein the second instructions are executable by the second hardware controller to:
retrieve the packaged version of the IO request from the designated region of the physical memory of the second hardware controller and add the retrieved packaged version of the IO request to an event queue of the protocol driver of the second hardware controller; and
perform the IO operation, which is specified by the packaged version of the IO request, on the volume of the storage array.

10. The storage array of claim 9, wherein:
the first hardware controller is to receive the IO request when the first hardware controller is to operate as a standby controller and the second hardware controller is to operate as an active controller.

11. The storage array of claim 9, wherein:
the given protocol is fibre channel;
the protocol driver of the first controller is a fibre channel driver; and
the protocol driver of the second controller is a fibre channel driver.

12. The storage array of claim 9, wherein:
the first instructions are executable by the first hardware controller to determine that the received IO request is to be forwarded to the second hardware controller, when the first hardware controller is not enabled to perform IO operations on the volume of the storage array.

13. The storage array of claim 9, further comprising:
a first hardware bridge device of the first hardware controller; and
a second hardware bridge device of the second hardware controller;
wherein the first and second hardware bridge devices are to provide the packaged version of the IO request from the designated region of physical memory of the first hardware controller to the designated region of the physical memory of the second hardware controller.

14. The storage array of claim 13, wherein the first and second hardware bridge devices are respective non-transparent bridge (NTB) devices that map the designated region of the physical memory of the first hardware controller to the designated region of the physical memory of the second hardware controller.

15. The storage array of claim 9, wherein:
the protocol driver of the first hardware controller comprises a kernel-level protocol driver; and
the protocol driver of the second hardware controller comprises a kernel-level protocol driver.

16. An article comprising at least one non-transitory machine-readable storage medium comprising instructions executable by a storage array comprising first and second controllers, wherein the instructions comprise:
- first instructions executable by the first controller to determine to forward an input/output IO request specifying an IO operation targeting a volume of the storage array, the IO request received by the first controller when the first controller is not enabled to perform IO operations on the targeted volume of the storage array and the second controller is enabled to perform IO operations on the targeted volume of the storage array;
- the first instructions comprising a protocol driver of the first controller for a given protocol;
- the protocol driver of the first controller executable by the first controller to generate a packaged version of the IO request that is packaged for placement on an event queue of a protocol driver for the given protocol;
- the first instructions executable by the first controller to provide the packaged version of the IO request to physical memory of the second controller by providing the packaged version of the IO request to a designated region of physical memory of the first controller that is mapped to a designated region of the physical memory of the second controller;
- the second instructions comprising a protocol driver of the second controller for a given protocol, and the second instructions executable by the second controller to:
  - retrieve the packaged version of the IO request from the designated region of the physical memory of the second controller and add the retrieved packaged version of the IO request to an event queue of the protocol driver of the second controller; and
  - perform the IO operation, which is specified by the packaged version of the IO request, on the volume of the storage array.

17. The article of claim 16, wherein:
the first instructions are executable by the first controller to provide the packaged version of the IO request to physical memory of the second controller via a first hardware bridge device of the first controller and a second hardware bridge device of the second controller to provide the packaged version of the IO request from the designated region of physical memory of the first controller to the designated region of the physical memory of the second controller.

18. The article of claim 17, wherein the first and second hardware bridge devices are respective non-transparent bridge (NTB) devices that map the designated region of the physical memory of the first controller to the designated region of the physical memory of the second controller.

19. The article of claim 16, wherein:
the given protocol is fibre channel;
the protocol driver of the first controller is a fibre channel driver; and
the protocol driver of the second controller is a fibre channel driver.

20. The article of claim 16, wherein the first controller is to receive the IO request when the first controller is to operate as a standby controller and the second controller is to operate as an active controller.

* * * * *